US007426186B2

(12) United States Patent
Acharya et al.

(10) Patent No.: US 7,426,186 B2
(45) Date of Patent: Sep. 16, 2008

(54) DATA PATH PROVISIONING IN A RECONFIGURABLE DATA NETWORK

(75) Inventors: Swarup Acharya, New Providence, NJ (US); Bhawna Gupta, Edison, NJ (US); Pankaj Risbood, Roselle, NJ (US); Anurag Srivastava, Roselle, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1113 days.

(21) Appl. No.: 10/345,612

(22) Filed: Jan. 16, 2003

(65) Prior Publication Data

US 2004/0141463 A1   Jul. 22, 2004

(51) Int. Cl.
*G01R 31/08* (2006.01)
(52) U.S. Cl. .................. 370/238; 370/252; 370/255; 370/401
(58) Field of Classification Search ............. 370/352, 370/255, 401, 465, 238, 252; 709/220, 249
See application file for complete search history.

(56) References Cited

U.S. PATENT DOCUMENTS

| 7,002,924 B2 * | 2/2006 | Braun et al. ............. 370/254 |
| 2002/0004843 A1 * | 1/2002 | Andersson et al. ......... 709/238 |
| 2002/0042274 A1 * | 4/2002 | Ades ..................... 455/445 |
| 2002/0141351 A1 * | 10/2002 | Maltz et al. ............. 370/254 |

OTHER PUBLICATIONS

W. Richard Stevens, 1994, TCP/IP Illustrated, vol. 1, Addison-Wesley, pp. 130-138.*
Alpar Juttner et al, 2001, Langrange Relaxation Based Method for the QoS Routing Problem, IEEE Infocom, entire reference.*
Alpar Juttner et al, "Lagrange Relaxation Based Method for the QoS Routing Problem," IEEE Infocom, 2001.*
S. Acharya et al., "Architecting Self-Tuning Optical Networks," *European Conference on Optical Communication*, 2002.
M. Kodialam and T.V. Lakshman, "Integrated Dynamic IP and Wavelength Routing in IP over WDM Networks," *IEEE infocom*, 2001.
S. Salsano et al., "Off-line Configuration of a MPLS over WDM Network under Time-Varying Offered Traffic," *IEEE Infocom*, 2002.
D. Katz, D. Yeung and K. Kompella, "Traffic Engineering Extensions to OSPF," Version Draft, Internet Engineering Task Force (IETF), Internet Draft, Oct. 2002.

(Continued)

*Primary Examiner*—Ricky Ngo
*Assistant Examiner*—Kibrom T Hailu

(57) ABSTRACT

A method for data path provisioning in a reconfigurable data network is disclosed. A data path between a source IP router and a destination IP router is determined taking into account the IP-subnets of the network interfaces of the IP routers included in the path. In one embodiment, the requirement that two IP routers can send packets via their connected interface if and only if the two interfaces are on the same subnet (i.e., the subnet constraint) is completely honored during the data path determination. In another embodiment, the data path is determined while allowing some number of violations of the subnet constraint. A transform network graph is computed and is used to determine the data path taking into account the IP-subnets.

14 Claims, 12 Drawing Sheets

OTHER PUBLICATIONS

A. Gencata and B. Mukherjee, "Virtual-Topology Adaptation for WDM Mesh Networks Under Dynamic Traffic," *IEEE Infocom*, 2002.

S. Chen and K. Nahrstedt, "On finding multi-constrained paths," *ICC*, 1998.

D. Awduche et al., "RSVP-TE: Extensions to RSVP for LSP Tunnels," Internet Engineering Task Force (IETF), Request for Comments: 3209, Dec. 2001.

User Network Interface (UNI) 1.0 Signaling Specification of the Optical Internetworking Forum (OIF), Oct. 1, 2002.

* cited by examiner

US 7,426,186 B2

DATA PATH PROVISIONING IN A RECONFIGURABLE DATA NETWORK

TECHNICAL FIELD

The present invention relates generally to data networking. More particularly, the invention relates to provisioning data paths in a reconfigurable data network.

BACKGROUND OF THE INVENTION

In most existing data networks, the network topology is fixed at the time the data network is created. For example an Internet Protocol (IP) data network may consist of a number of IP routers interconnected by a core transport network which may be, for example, a mesh network. The mesh network allows for various connections between the IP routers. However, in the past, the network topology of such networks has generally been static. That is, once the network is designed and implemented, and various data paths between the IP routers are provisioned, these data paths do not change because the topology of the data network does not change. The static nature of such networks results in problems when network usage changes and more or less capacity is needed among and between various network nodes. In this case, any change to the network topology is a time consuming and expensive proposition.

The introduction of new core transport network technologies is changing the static nature of data networks and is providing a basis for offering more interesting network services. For example, in a Wavelength Division Multiplexed (WDM) optical mesh network, IP routers are connected directly to a switched optical core transport network consisting of optical cross-connect (OXC) switches interconnected via high-speed Dense WDM (DWDM) line systems. The switching capability of the optical core network allows for the creation of end-to-end light paths across the optical core. Since the OXCs can be switched relatively easily, the core network is dynamically reconfigurable and as a result the overall network topology is reconfigurable.

One of the benefits of a reconfigurable core network as described above is that it allows for the efficient provisioning of data paths having a guaranteed bandwidth. Such guaranteed bandwidth paths allow for the provisioning of higher level quality of service (QoS) dependent network services. The rapid switching capabilities of OXCs allow the optical core network to be quickly reconfigured depending on bandwidth requirements.

In the reconfigurable networks as described above, there are two types of connectivity to consider. The first is the connectivity in the optical core transport layer that is defined by the physical connections created by the OXC switches. In the optical core transport layer data may be transferred between two endpoints if there exists an appropriate optical path between the endpoints. Another type of connectivity is in the IP layer that is defined by the connectivity between the IP routers. As is well known, in accordance with the IP data transmission protocol, IP routers route data between routers based on the network topology interconnecting the various IP routers. Thus, of course, the IP domain connectivity is dependent upon the optical domain connectivity. Looking at it another way, the optical domain is the physical transport layer used to set up a network topology upon which the IP layer depends for data transmission.

One typical approach to IP routing in a WDM optical network is to separate the routing at each layer so that the routing decisions are independent of each other. First the optical routing is considered in order to set up the network topology which is then used for the IP layer routing of data packets. Another approach to routing which has received attention is so-called cross-domain routing approaches which incorporate traffic and topology information from both the optical and IP layers in the data path selection process. For example, M. Kodialam and T. V. Lakshman, *Integrated Dynamic IP and Wavelength Routing in IP Over WDM Networks*, IEEE Infocom 2001, which is incorporated herein by reference, describes an algorithm for routing of bandwidth guaranteed paths in IP over WDM networks taking into account the combined topology and resource usage information at the IP and optical layers. The goal of such cross-domain routing is to create a more efficient end-to-end network by identifying bandwidth that would be wasted if each domain were routed independently. A cross-domain path between a source node and destination node can potentially cross the boundary between IP layer and optical transport layer multiple times.

While cross-domain routing provides benefits in data networks, we have discovered that heretofore unknown problems exist in this type of routing.

SUMMARY OF THE INVENTION

We have discovered that so-called IP-subnets must be taken into account when performing cross-domain routing at the IP layer and the underlying core network layer. The prior art does not take IP-subnets into account, and as a result, the prior art cross-domain routing algorithms may not identify appropriate data paths at the IP layer.

As will be described in further detail below, subnets are a mechanism to reduce routing overheads of IP networks by grouping a set of addresses under a single subnet identifier. In turn, the routing protocols route to subnets and not to individual hosts. A key restriction of the IP subnet model is that two IP routers can send packets via their connected interface if and only if the two interfaces are on the same subnet. This requirement is referred to as the subnet constraint. Thus, subnets must be taken into account when performing cross-domain routing.

One embodiment of the invention is a method for determining a data path in a network which transmits data packets between IP routers via an IP protocol over a reconfigurable core network. Each of the IP routers has at least one network interface for connecting to the core network, with the network interfaces having associated IP-subnets. When a request is received to provision a data path from a first IP router to a second IP router, such data path is determined taking into account the IP-subnets of the network interfaces of the IP routers included in the path.

In one embodiment of the invention, the data path is computed while completely honoring the subnet constraint. In a second embodiment, the data path is computed while allowing a number of violations of the subnet constraint. As will be described in further detail below, this allows for a tradeoff between the cost of changing network interface subnets and the cost of provisioning less efficient (e.g., longer) network paths. Generally, a path which does not allow for any subnet constraint violations will be longer than a path which allows some number of subnet constraint violations. Thus, a network provider may be willing to incur the one-time cost of changing interface subnets in order to allow a shorter provisioned data path between a source and destination router.

These and other advantages of the invention will be apparent to those of ordinary skill in the art by reference to the following detailed description and the accompanying drawings.

DETAILED DESCRIPTION

The use of IP routing techniques over a reconfigurable core transport network allows service providers to provide advanced network services to its customers. Multiprotocol Label Switching (MPLS) is particularly useful in these types of networks. MPLS networks make use of Label Switch Paths (LSPs) which are paths established by network operators for a variety of purposes, such as to guarantee a certain level of performance, to route around network congestion, or to create IP tunnels for network-based virtual private networks. LSPs are similar to circuit-switched paths in ATM or Frame Relay networks, except that they are not dependent on any particular transport layer technology. As such, one of the main benefits of MPLS is the ability to create end-to-end circuits, with specific performance characteristics, across any type of transport medium. In an MPLS network, incoming data packets are assigned a label by a network edge router. Packets are thereafter forwarded along the LSP where each IP router makes forwarding decisions based solely on the contents of the label. At each hop, the IP router strips off the existing label and applies a new label which tells the next hop how to forward the packet. MPLS is a well known data networking protocol, the details of which will not be described herein. MPLS is described in further detail in, *MPLS: Technology and Applications* by Bruce S. Davie, Yakov Rekhter, Morgan Kaufmann Publishers, ISBN: 1558606564, 1st edition (May 19, 2000); *Multi-Protocol Label Switching* by Uyless Black, Prentice Hall PTR; ISBN: 0130158232; 1st edition (Dec. 27, 2000); and *The MPLS Primer: An Introduction to Multiprotocol Label Switching* by Sean Harnedy, Prentice Hall, ISBN: 0130329800; 1st edition (Nov. 15, 2001); all of which are incorporated herein by reference.

Figure 1:
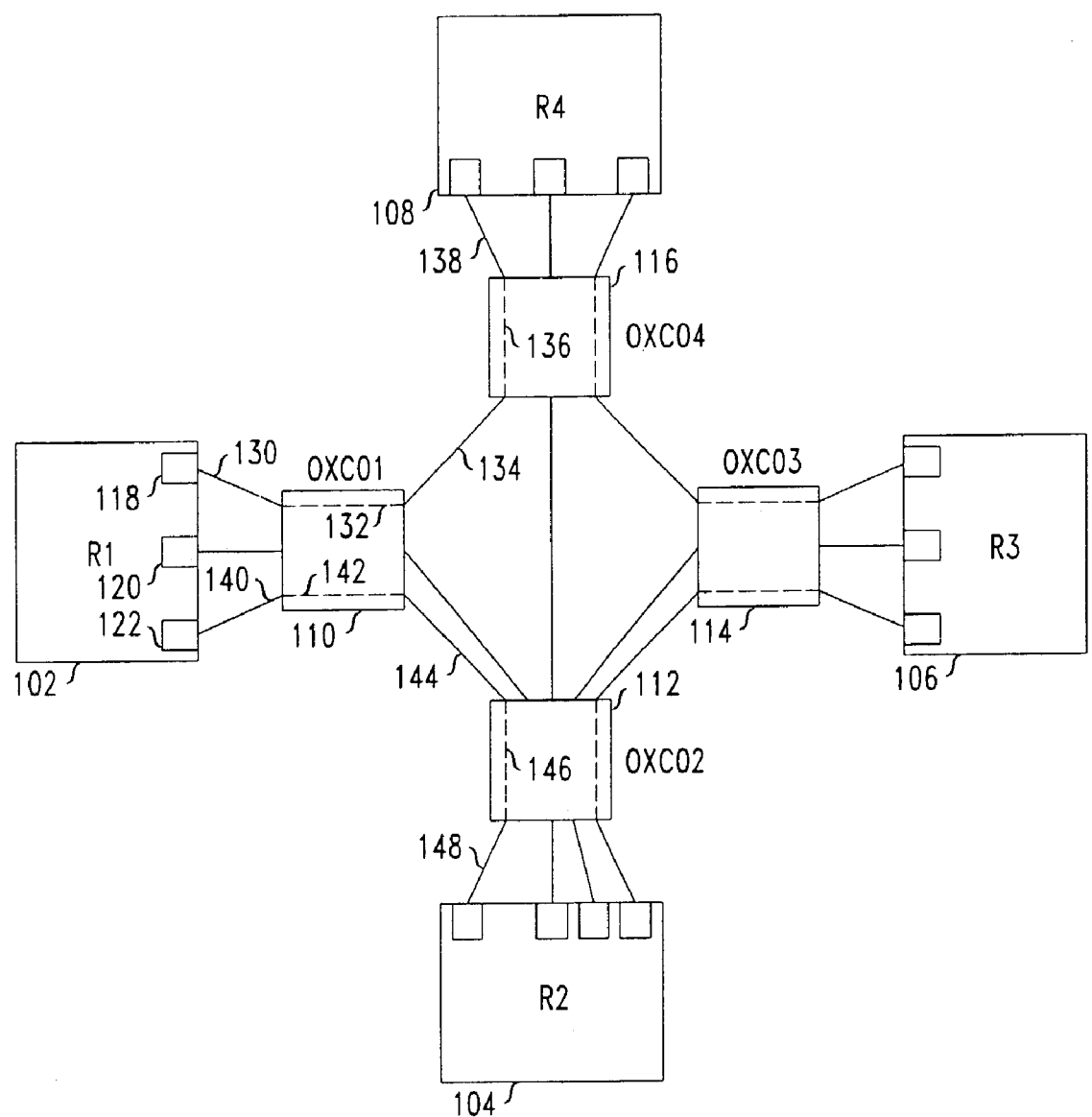
FIG. 1 shows a network of four IP routers connected to an optical core network.

FIG. 1 shows a network of four IP routers R1 102, R2 104, R3 106 and R4 108 connected to an optical core transport network consisting of four optical cross connects (OXCs) OXC01 110, OXC02 112, OXC03 114 and OXC04 116. The dotted lines within the OXCs represent cross connects within each OXC which enable the OXCs to switch optical signals from any of its input ports to any of its output ports. Such OXCs are well known in the art, for example as described in T. E. Stern and K. Bala, *Multiwavelength Optical Networks: A Layered Approach*, Addison-Wesley 1999, which is incorporated herein by reference. The OXCs are interconnected by a WDM line system as illustrated in FIG. 1 by the solid lines connecting the OXCs.

Each IP router contains an interface which connects the IP router to one or more input ports of the OXCs. For example, IP router R1 102 contains interfaces 118, 120, 122 for connecting IP router R1 102 to OXC01 110. In one embodiment, each router is running an interior gateway protocol (IGP) implementing appropriate routing such as Open Shortest Path First (OSPF). As such, each IP router has knowledge of the network topology. Interior gateway protocols such as OSPF are well known in the art of data network and will not be described in further detail herein. OSPF is described in further detail in J. T. Moy, *OSPF: Anatomy of an Internet Routing Protocol*, Addison-Wesley, 1998.

Figure 2:
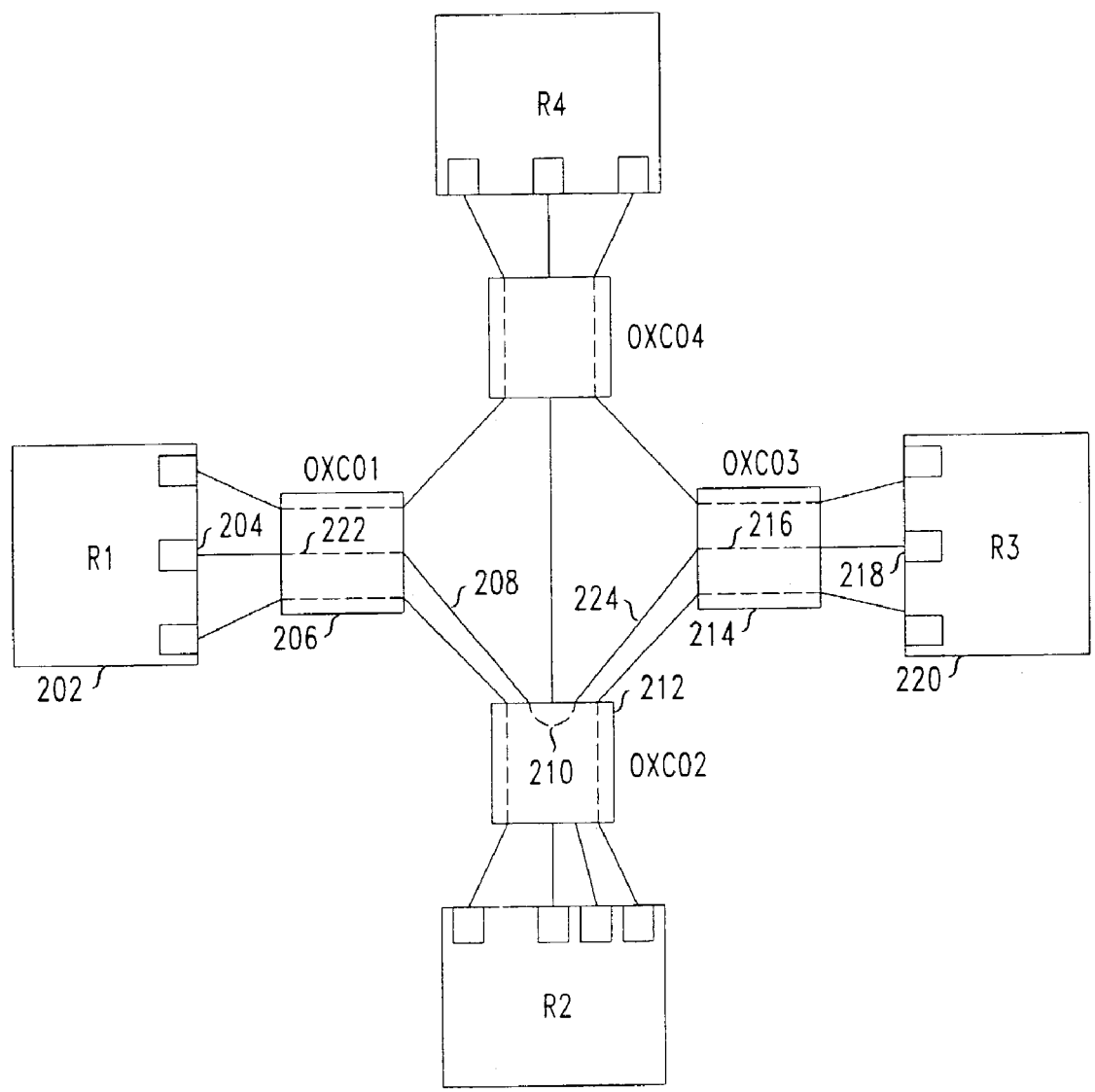
FIG. 2 shows the network of FIG. 1 which has been reconfigured to create additional bandwidth.

Consider a request for some specific bandwidth from IP router R1 102 to IP router R3 106. If it is assumed that the IP links from R1 102 to R4 108 (made up of line 130, cross connect 132, DWDM line 134, cross connect 136, line 138) and from R1 102 to R2 104 (made up of line 140, cross connect 142, DWDM line 144, cross connect 146, line 148) are at full capacity, then the request for bandwidth from R1 102 to R3 106 would be denied since there is no available path in the network topology from R1 102 to R3 106. However, since the optical core network is reconfigurable, a request to create additional bandwidth could be considered. Thus, a request to reconfigure the optical core to create additional bandwidth between R1 102 and R3 106 could result in a core reconfiguration as shown in FIG. 2. As shown in FIG. 2, OXC01 206 is reconfigured to switch the output from R1 202 interface 204 via internal cross connect 222 to DWDM line 208 to OXC02 212. OXC02 212 configures internal cross connect 210 to switch DWDM line 208 to DWDM line 224. OXC03 214 configures internal cross connect 216 to switch DWDM line 224 to interface 218 of IP router R3 220. Thus, R1 202 and R3 220 are made neighbors at the IP protocol layer via their free interfaces.

In one embodiment, the request for additional bandwidth via reconfiguration of the optical core may be accomplished using the User Network Interface (UNI) 1.0 of the Optical Internetworking Forum (OIF). UNI is a well know specification that enables clients to set up an optical connection dynamically using signaling procedures compatible with MPLS. The provisioning of additional bandwidth via transport network reconfiguration would be well known to one skilled in the art and the details of such reconfiguration will not be described herein.

Figure 3:
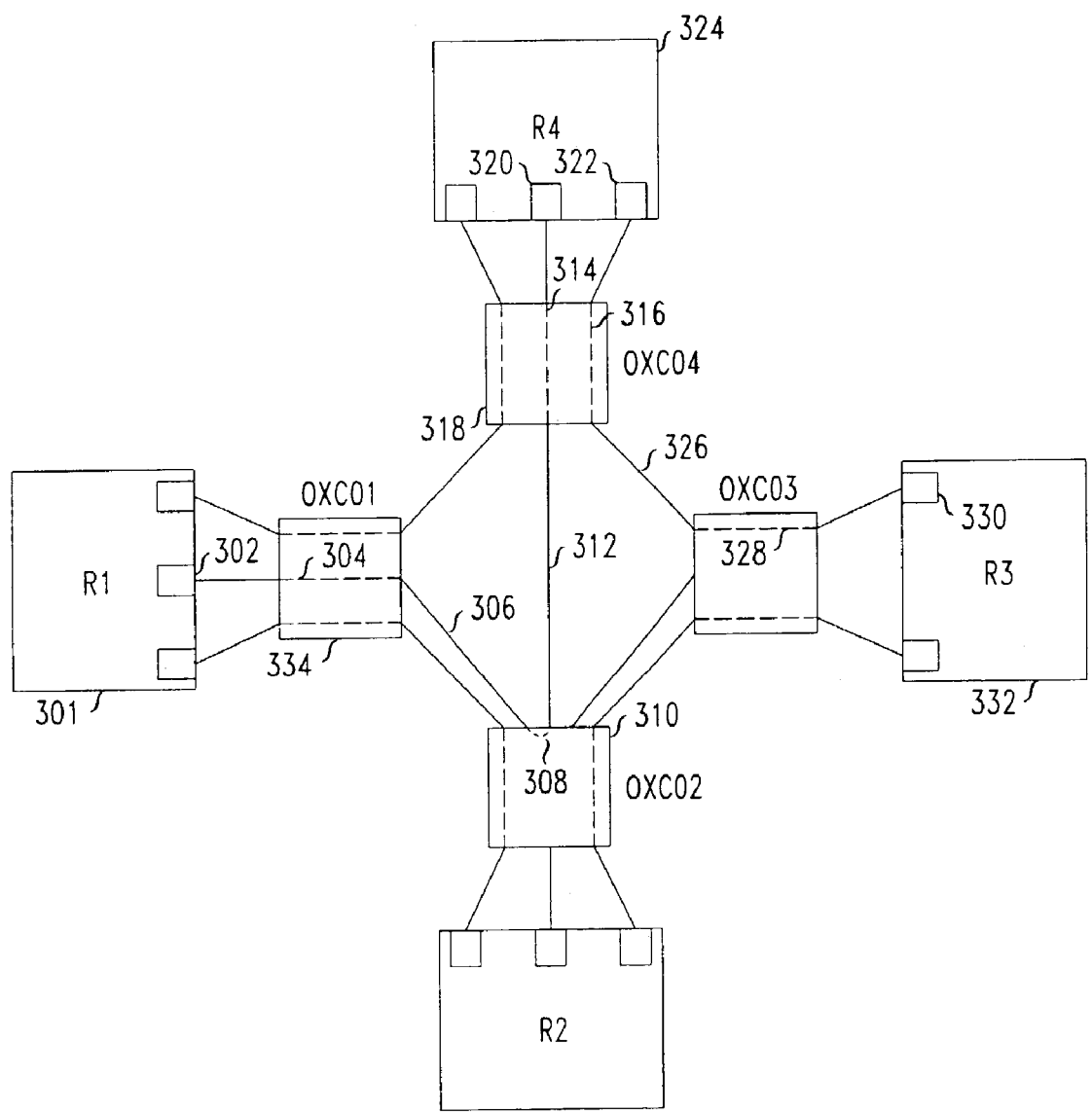
FIG. 3 shows a network reconfiguration utilizing cross-domain routing to create additional bandwidth.

It is noted that it may not be possible to provision a one-hop IP path through the optical core. Consider the network shown in FIG. 3. The network of FIG. 3 is similar to that of FIG. 2, but there is no free interface on IP router R3 332. As such, there is no way to provision an optical path to provide a one-hop IP path from R1 301 to R3 332. However, there is enough capacity in the network shown in FIG. 3 to provision an IP path from R1 301 to R3 332 if one takes an integrated cross-domain view of the network.

That is, by incorporating topology information from both the optical layer and the IP layer sufficient capacity can be found. Thus, a request for additional bandwidth between R1 301 and R3 332 could result in a core reconfiguration as shown in FIG. 3. As shown in FIG. 3, OXC01 334 is reconfigured to switch the output from R1 301 interface 302 via internal cross connect 304 to DWDM line 306 to OXC02 310. OXC02 310 configures internal cross connect 308 to switch DWDM line 306 to DWDM line 312. OXC04 318 configures internal cross connect 314 to switch DWDM line 312 to interface 320 of IP router R4 324. R4 324 is a neighbor of R3 332 at the IP protocol layer as per the existing network topology (as per the connection from interface 322 to cross connect 316 to DWDM line 326 to cross connect 328 to interface 330). The bandwidth request may be satisfied by setting up MPLS routing from R1 301 to R4 324 to R3 332. Thus, cross-domain routing creates a more efficient end-to-end network by utilizing available network resources that would otherwise go unutilized if each domain were routed separately.

While cross-domain routing provides benefits in data networks, we have discovered that heretofore unknown problems exist in this type of routing. More particularly, we have discovered that so-called IP-subnets must be taken into account when performing cross-domain routing at the IP layer and the underlying core network layer. IP subnets are used as a mechanism to reduce routing overheads of IP networks by grouping a set of addresses under a single subnet identifier. In turn, routing protocols route data packets to subnet addresses and not to individual hosts. For example, an interface with address 10.3.2.1/24 is on subnet 10.3.2.0 (i.e., a 24-bit subnet mask). A key restriction of the IP subnet routing model is that two IP routers can send packets to each other via their connected interfaces if and only if the two interfaces are on the same subnet. We have discovered that this restriction, herein referred to as the subnet constraint, must be taken into account when performing cross-domain routing.

In prior art network provisioning, subnet and interface address assignments have typically been considered a one-time configuration issue since the network topology was generally not reconfigurable. However, as new technologies, such as reconfigurable WDM optical networks emerge, subnets and interface addresses must be taken into account. Subnet constraints must be taken into account when determining data path routing in reconfigurable data networks as the subnet constraint fundamentally limits the reconfigurability of these networks.

The data network routing described above in connection with FIGS. 1-3 ignored the subnet constraint and merely determined the shortest path to satisfy a given bandwidth request. In those figures, there was no restriction on the connectivity of IP router interfaces via the optical core.

Figure 4:
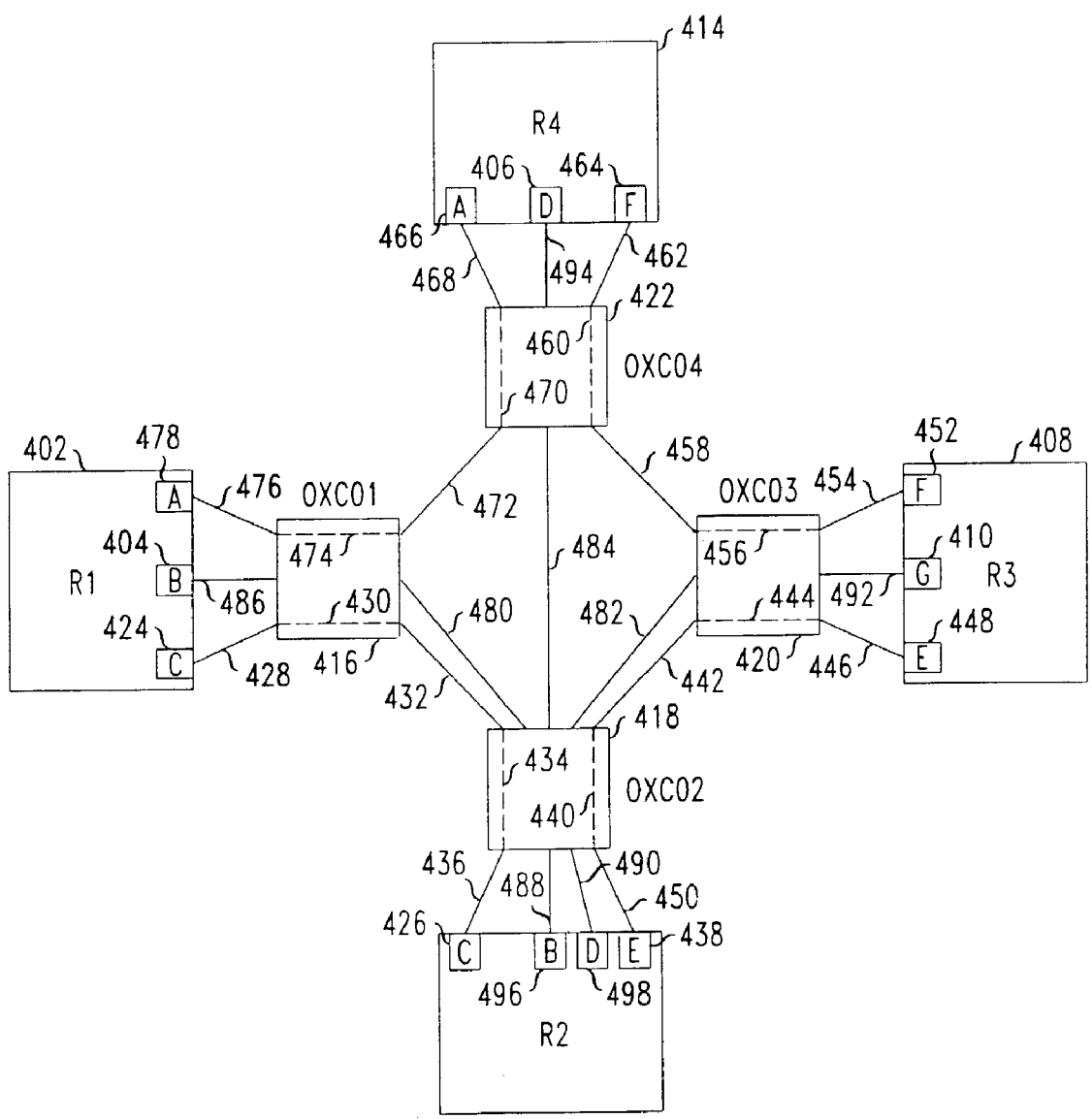
FIG. 4 shows a network wherein the IP router interfaces are assigned IP subnets.

However, referring now to FIG. 4, assume that each IP router interface is assigned an address and thus associated with a particular subnet. As shown in FIG. 4, each subnet is represented by a letter A-G and each interface in FIG. 4 is labeled with its associated subnet. In accordance with the subnet constraint, two IP router interfaces can be connected by an optical path only if they have the same associated subnet. Consider now the problem described in conjunction with FIG. 2 of provisioning IP bandwidth between IP routers R1 402 and R3 408. The solution shown in FIG. 2 is unavailable taking into account the subnet constraint because interface 404 has a subnet of B while interface 410 has a subnet of G. As such, these two interfaces cannot be connected via an optical path. Similarly, the solution shown in FIG. 3 is also unavailable because interface 404 has a subnet of B while interface 406 has a subnet of D.

Figure 5:
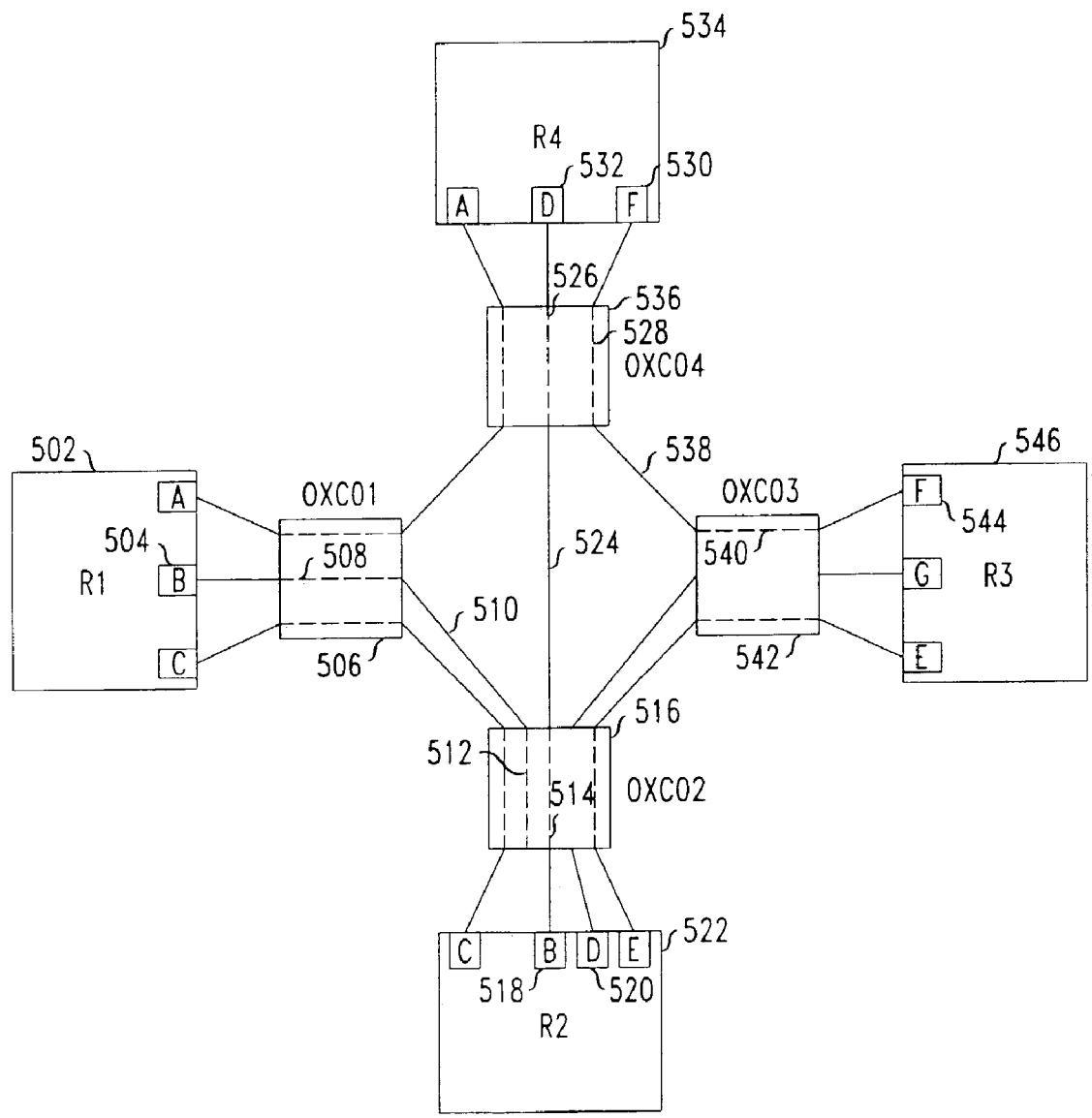
FIG. 5 shows the network of FIG. 4 which has been reconfigured taking into account the IP subnets in order to provide additional bandwidth.

Thus, assuming an existing network topology as shown in FIG. 4, FIG. 5 shows the provisioning of a data path from R1 502 to R3 546 which has been determined in accordance with the present invention. That is, the data path provisioning shown in FIG. 5 was determined taking into account the IP-subnets of the network interfaces of the IP routers included in the path. Thus, a request for additional bandwidth between R1 502 and R3 546 would result in a core reconfiguration as shown in FIG. 5. As shown in FIG. 5, OXC01 506 is reconfigured to switch the output from R1 502 interface 504 (subnet B) via internal cross connect 508 to DWDM line 510 to OXC02 516. OXC02 516 configures internal cross connect 512 to switch DWDM line 510 to R2 522 interface 518 (subnet B). At this point the data path has crossed from the optical domain into the IP domain. The data path then continues via the pie-existing path (which has sufficient additional bandwidth) from IP router R2 522 interface 520 (subnet D) back into the optical domain and OXC02 516 configures internal cross connect 514 to switch interface 520 of R2 522 to WDM line 524. OXC04 536 configures internal cross connect 526 to switch DWDM line 524 to interface 532 (subnet D) of R4 534, once again returning the data path to the IP domain. The data path then continues via the pre-existing path (which has sufficient additional bandwidth) from IP router R4 534 interface 530 (subnet F) back into the optical domain to OXC04 536, via internal cross connect 528 to WDM line 538, to OXC03 542, via internal cross connect 540 to interface 544 (subnet F) of R3 546, thus completing the data path from R1 502 to R3 546 while satisfying the above described subnet constraint.

As will be recognized by the above description, there is a routing trade-off between honoring subnet constraints and the length of the shortest path. A longer path is wasteful of network resources and makes the network less efficient. On the other hand, changing subnets and interface addresses involves a significant upfront reconfiguration overhead but results in a more efficient network. We will now describe two algorithms for determining routing paths while taking into account subnet constraints. The first algorithm finds the shortest path between a source router and destination router which path satisfies the subnet constraint. More particularly, the first algorithm assumes that no changes may be made to the assigned subnets and attempts to find the shortest path using the existing subnet assignments. The second algorithm is more flexible and allows for some subnet violations (thus assuming a willingness to incur the upfront cost of changing at least some subnets in the interest of a shorter routing path). The second algorithm finds the shortest path between a source router and destination router which path allows a certain number of subnet constraint violations.

Figure 6:
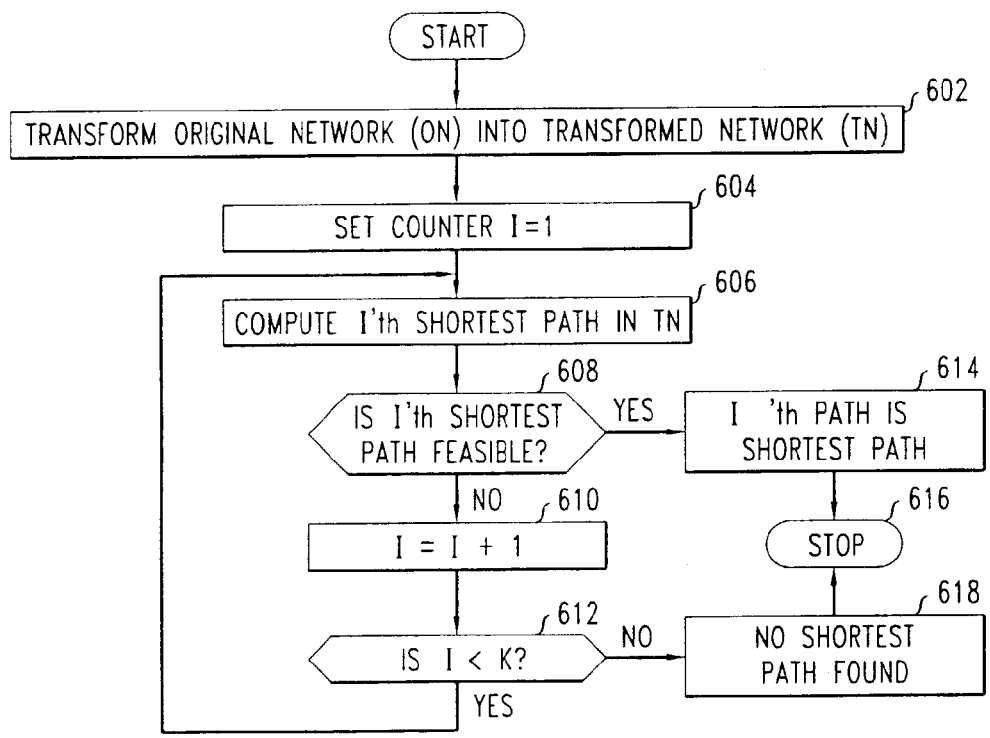
FIG. 6 shows a flowchart describing the steps of the method to determine the shortest data path between a source router and destination router which path satisfies the subnet constraint.
Figure 7:
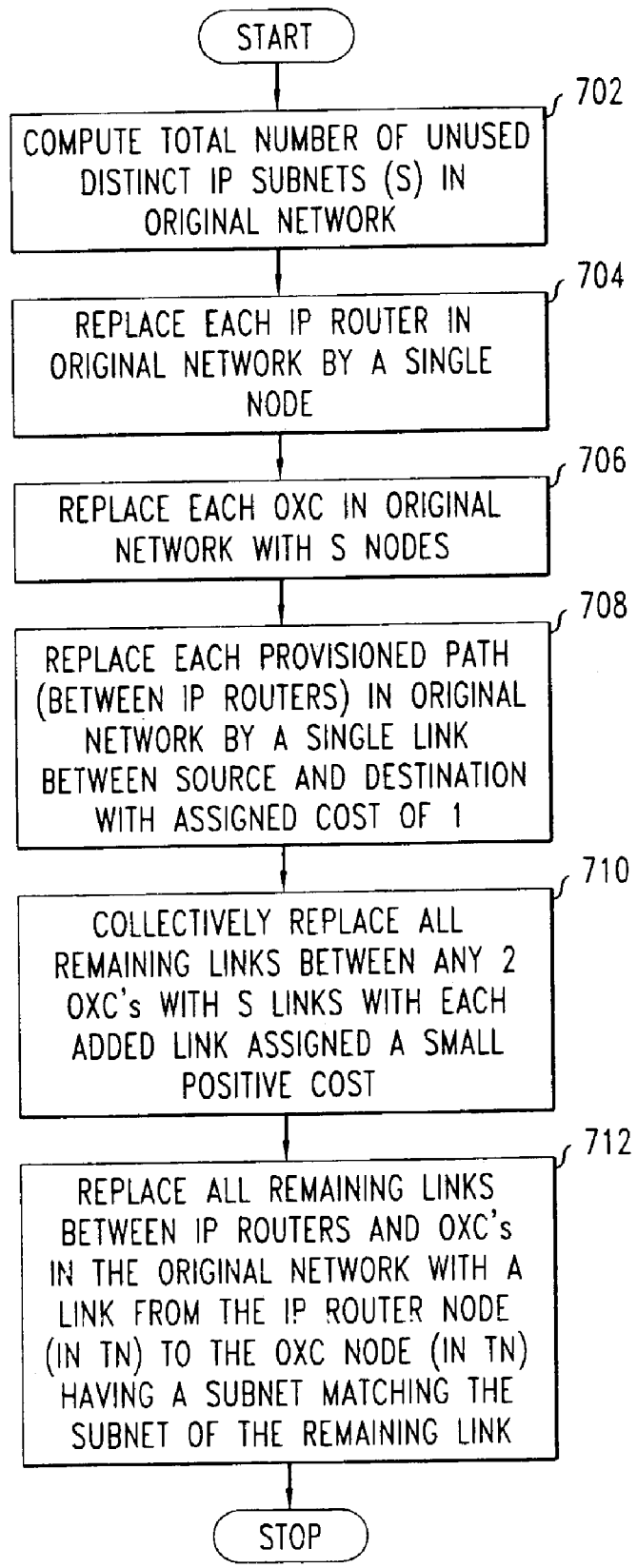
FIG. 7 shows a flowchart of the steps to transform an original network graph into a transformed network graph.
Figure 8:
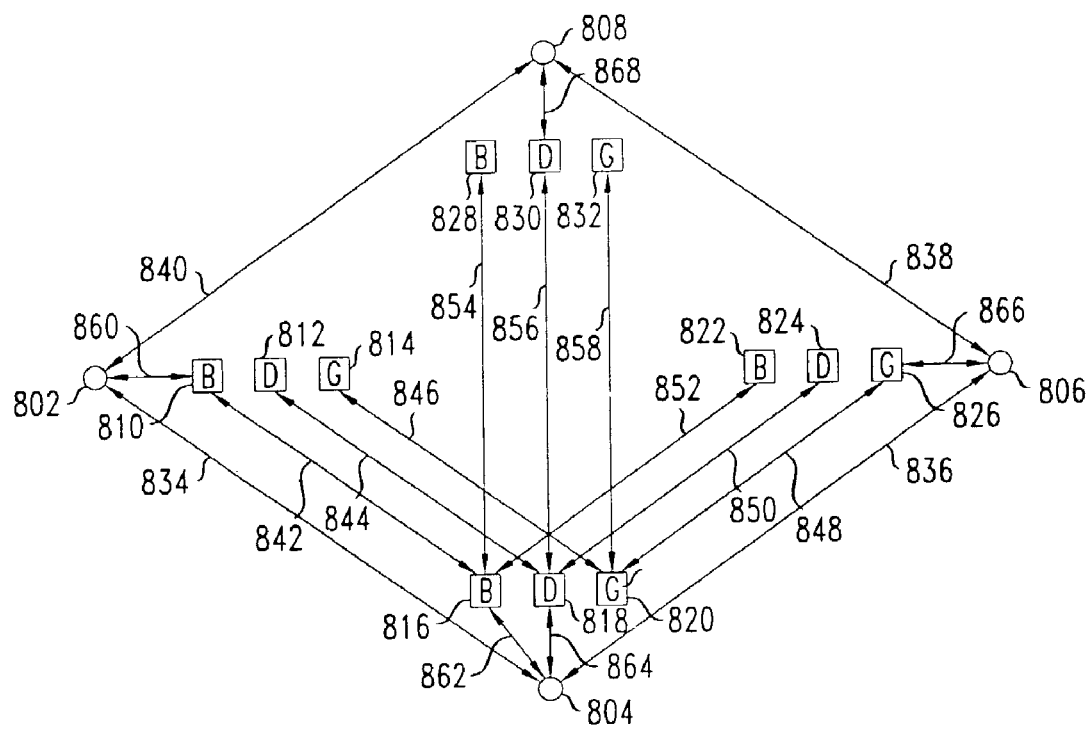
FIG. 8 shows a transformed network graph computed in accordance with the steps shown in FIG. 7.

The first algorithm is described in conjunction with FIGS. 6-8. FIG. 6 shows a flowchart describing the steps of the method to determine the shortest data path between a source router and destination router which path satisfies the subnet constraint. As would be readily recognized by one skilled in the art, these steps could be performed by an appropriately configured computer containing program code defining the steps to be performed. The configuration and programming of computers is well known in the art. Given the description of the method herein, one skilled in the art of data network and computer programming could readily implement the method.

First, in step 602, a network graph of the original network (ON) is transformed into a network graph of a transformed network (TN). The ON graph is a network graph describing the nodes and connections between the nodes. In the example used in the present discussion, we will assume that the ON graph is as shown in FIG. 4. Thus, the first step is to transform the ON graph shown in FIG. 4 to a TN graph. The steps to transform an ON graph into a TN graph are described in conjunction with the flowchart of FIG. 7. The TN graph is shown in FIG. 8.

Turning now to FIG. 7, the first step 702 is to compute the total number of unused distinct IP subnets (S) in the ON. An IP subnet is considered unused if it is not connected to any other IP router. Referring to the ON of FIG. 4, it is seen that the distinct subnets are A, B, C, D, E, F, G, and the unused subnets are B, D, and G, and thus S=3. In step 704 each IP router in the ON is replaced by a single node. Thus, IP routers R1 402, R2 412, R3 408 and R4 414 are replaced in the TN by nodes 802, 804, 806, and 808 respectively. In step 706 each OXC in the ON is replaced with S nodes in the TN. Each of the S nodes in the TN is associated with one of the unused subnets. Thus, OXC01 416 in the ON is replaced with nodes 810, 812 and 814 in the TN. As shown in FIG. 8, each of the nodes 810, 812, 814 is associated with one of the unused subnets. In a similar manner, OXC02 418 in the ON is replaced with nodes 816, 818 and 820 in the TN, OXC03 420 in the ON is replaced with nodes 822, 824 and 826 in the TN, and OXC04 414 in the ON is replaced with nodes 828, 830 and 832 in the TN.

In step 708 each provisioned path (between IP routers) in the ON is replaced by a single link between the source and destination in the TN. The single link is assigned a cost of 1 to represent a single IP hop. The cost will be used by the algorithm of FIG. 6 in its shortest path calculation of step 606. In accordance with step 708 the path in the ON connecting interface 424 (having associated subnet C) of R1 402 to interface 426 (having associated subnet C) of R2 412 via line 428, internal cross connect 430, DWDM line 432, internal cross connect 434 and line 436 is replaced with link 834 in the TN. Similarly, the path in the ON connecting interface 438 (having associated subnet E) of R2 412 to interface 448 (having associated subnet E) of R3 408 via line 450, internal cross connect 440, DWDM line 442, internal cross connect 444 and line 446 is replaced with link 836 in the TN. Similarly, the path in the ON connecting interface 452 (having associated subnet F) of R3 408 to interface 464 (having associated subnet F) of R4 414 via line 454, internal cross connect 456, DWDM line 458, internal cross connect 460 and line 462 is replaced with link 838 in the TN. Similarly, the path in the ON connecting interface 466 (having associated subnet A) of R4 414 to interface 478 (having associated subnet A) of R1 402 via line 468, internal cross connect 470, DWDM line 472, internal cross connect 474 and line 476 is replaced with link 840 in the TN.

In step 710, the remaining links (i.e., those not replaced in step 708) in the ON are replaced as follows. If there are one or more links between any two OXC's, those one or more links are collectively replaced with S links. Thus, link 480 between OXC01 416 and OXC02 418 in the ON is replaced with links 842, 844, 846 in the TN. The links added to the TN in step 710 are added to connect nodes which were added to the TN in step 706 such that nodes with the same associated subnet are connected. As such, link 842 connects nodes 810 and 816 (each having associated subnet B), link 844 connects nodes 812 and 818 (each having associated subnet D), and link 846 connects nodes 814 and 820 (each having associated subnet G). In a similar manner unused link 482 between OXC02 418 and OXC03 420 in the ON is replaced with links 848, 850, 852 in the TN, and unused link 484 between OXC02 418 and OXC04 422 in the ON is replaced with links 854, 856, 858 in the TN. Each of the links added in step 710 is assigned a small positive cost.

In step 712, the remaining links between IP routers and OXC's (i.e., those not replaced in step 708) in the ON are replaced as follows. Each such remaining link in the ON is replaced by a link from an IP router node (added in step 704) to the OXC node (added in step 706) having a subnet matching the subnet of the remaining link. Thus, unused link 486 (connected to interface 404 having subnet B) in the ON is replaced with link 860 in the TN. Link 860 connects node 802 to node 810 (which has associated subnet B). Similarly, unused link 488 (connected to interface 496 having subnet B) in the ON is replaced with link 862 in the TN. Link 862 connects node 804 to node 816 (which has associated subnet B). Similarly, unused link 490 (connected to interface 498 having subnet D) in the ON is replaced with link 864 in the TN. Link 864 connects node 804 to node 818 (which has associated subnet D). Similarly, unused link 492 (connected to interface 410 having subnet G) in the ON is replaced with link 866 in the TN. Link 866 connects node 806 to node 826 (which has associated subnet G). Similarly, unused link 494 (connected to interface 406 having subnet D) in the ON is replaced with link 868 in the TN. Link 868 connects node 808 to node 830 (which has associated subnet D). Each of the links added to the TN in step 712 are assigned a cost of ½.

A note here about the costs assigned to various links during the transformation steps. Recall that the goal in the embodiment being described is to find the shortest IP hop path. As such, a cost is assigned to a link when an IP router is crossed. All free external links between a router and an OXC are assigned a cost of ½ and all virtual short-circuit links are assigned a cost of 1. Virtual short-circuit links are links between IP routers that exist in the virtual topology (as supported by the optical core transport network) as seen by the IP routers. The free links in the optical network are assigned a small cost such that the algorithm will prefer a logical link over creating any new IP connectivity and that two paths having equal hops are distinguished by their optical resource utilization. It is noted that the algorithm itself is independent of the cost assignments. Depending on the requirements of the particular implementation, the costs may be assigned differently. For example, the costs may be assigned to give preference to optical resources if that is the goal of the particular implementation. The costs as assigned in the particular embodiment described here are consistent with the goal of optimizing IP network performance.

At this point, the transformation of the ON to the TN (step 602) is complete and the method continues with step 604. In step 604 a counter I is set to 1. In step 606 the I'th shortest path in the TN is computed. One skilled in the art would readily recognize that there are various ways to compute the I'th shortest path given the TN of FIG. 8. For example, the Dijkstra algorithm may be used. The Dijkstra algorithm is described in E. Dijkstra, *A Note on Two Problems in Connection with Graphs*, Numerische Mathematik, 1998, which is incorporated herein by reference. Alternatively, Lawler's algorithm may be used. Lawler's algorithm is described in E. L. Lawler, *A Procedure for Computing the K Best Solutions to Discrete Optimization Problems and its Application to Shortest Path Problems*, Management Science, 1972, which is incorporated herein by reference.

Following the computation of a shortest path in step 606, it is determined in step 608 whether that path is so-called feasible. The requirement of step 606 stems from the fact that in the creation of the TN, each OXC node was expanded into S smaller nodes. Thus, if there are less than S links between a pair of OXC's in the actual network, a path may be found in the TN that may in fact be unrealizable in the actual network. For example, a path in the TN which uses both links 854 and 856 would be infeasible because there is only one actual link 484 in the actual network. Thus, as used herein, the term feasible means that a path found in the TN may be implemented in the actual network because there are sufficient network resources. A path found using the TN is infeasible if there are insufficient network resources in the actual network to implement such path. Feasibility may be determined by reverse mapping the nodes and links of the path found in step 606 to the elements in the original network from which the nodes and links derive to determine if the original network has sufficient resources for the path.

Returning now to FIG. 6, if it is determined in step 608 that the Ith path is feasible, then the Ith path is the shortest path between the source router and destination router which satisfies the subnet constraint. The method ends in step 616.

If it is determined in step 608 that the Ith path is not feasible, then I is incremented by one in step 610 and in step 612 it is determined whether I<K where K represent the upper limit on the number of paths which will be computed by the algorithm. The particular value of K is a design choice depending on the particular implementation. If I<K then control returns to step 606. Thus, steps 606 through 612 will continue until I=K, at which time it will be concluded in step 618 that no shortest path is available and the method ends in step 616.

Figure 9A:
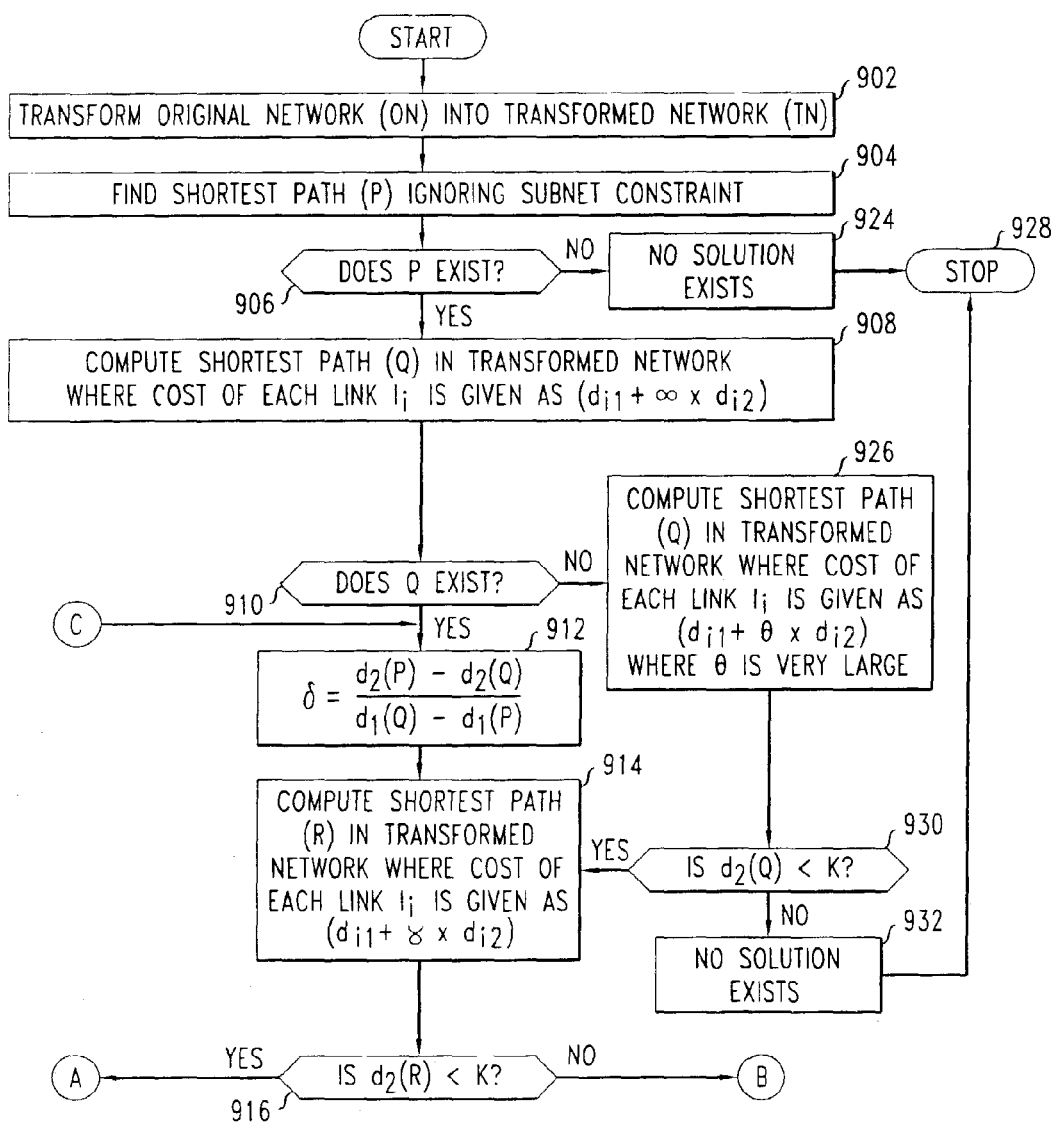
FIGS. 9A and 9B show a flowchart describing the steps of the method to determine the shortest data path between a source router and destination router which path satisfies the subnet constraint while allowing a number of subnet constraint violations.
Figure 9B:
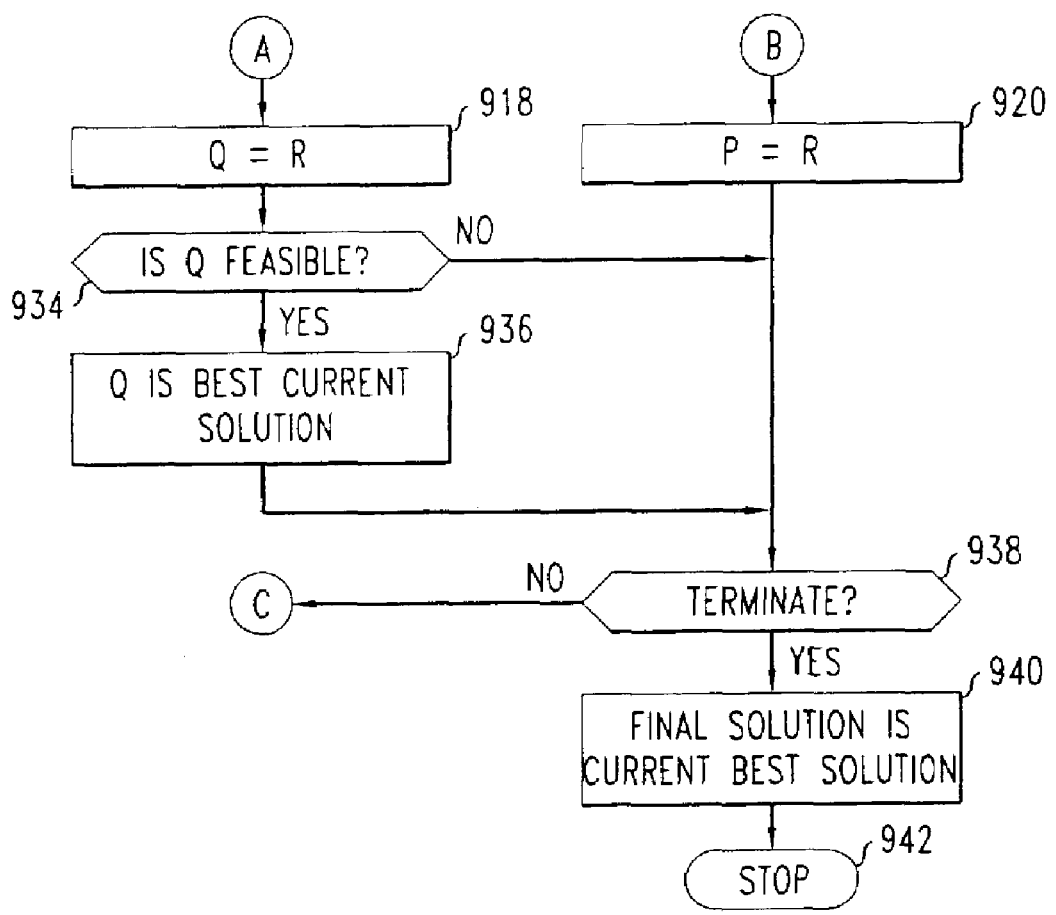
Figure 10:
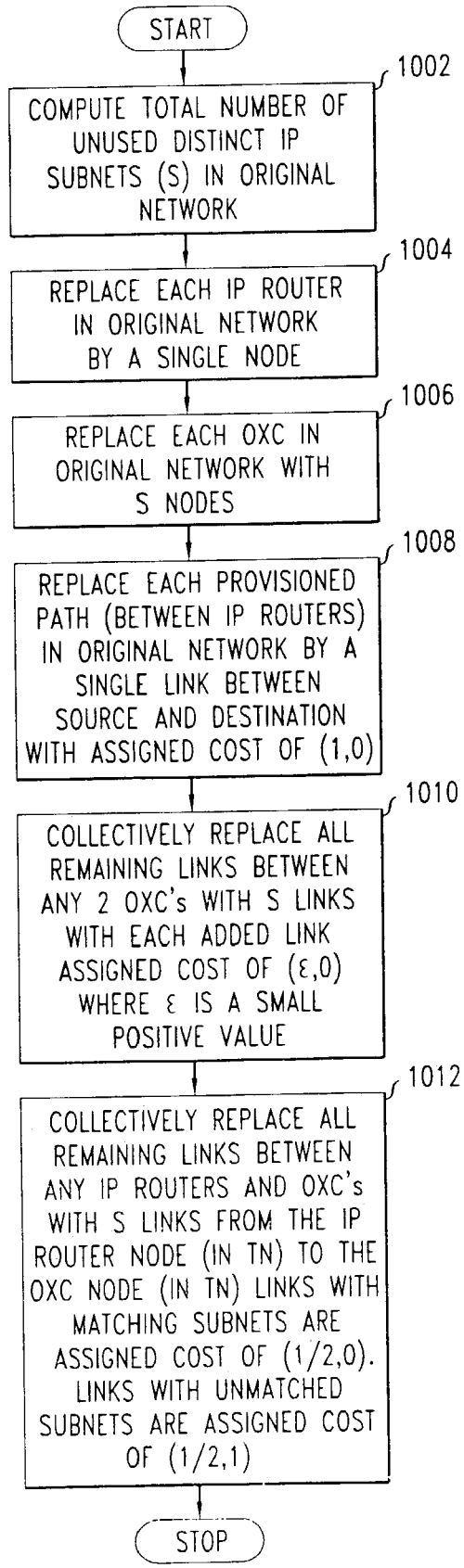
FIG. 10 shows a flowchart of the steps to transform an original network graph into a transformed network graph.
Figure 11:
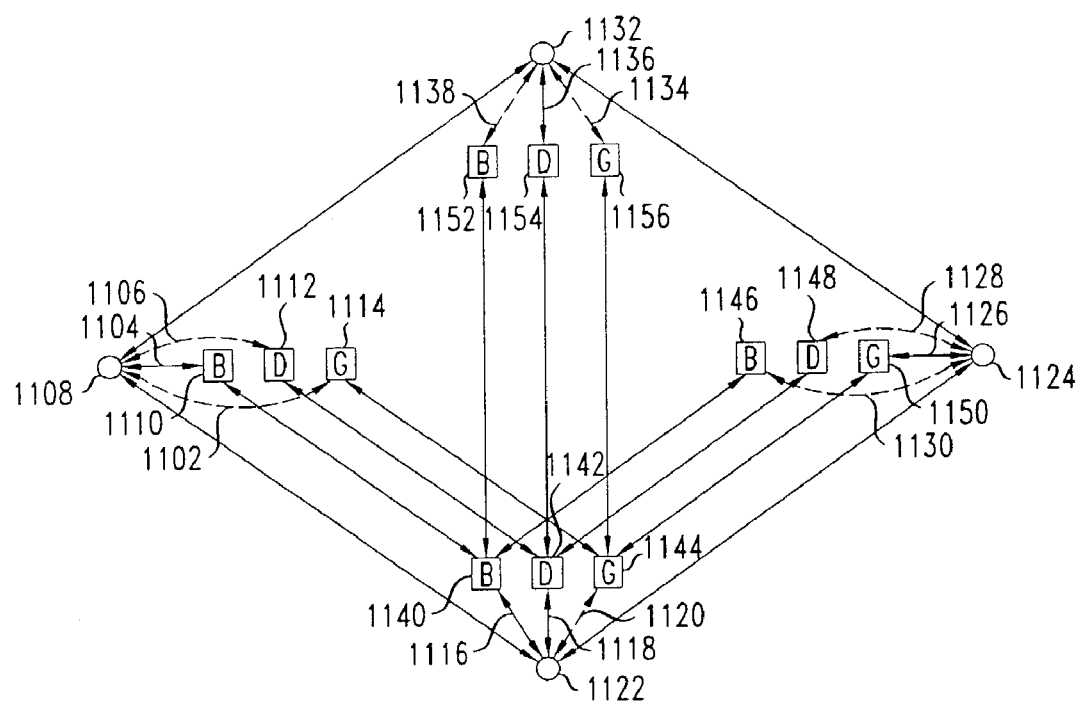
FIG. 11 shows a transformed network graph computed in accordance with the steps shown in FIG. 10.

We will now describe the second algorithm in conjunction with FIGS. 9-11. As described above, this second algorithm finds the shortest path between a source router and destination router which path allows K subnet constraint violations.

First, in step 902, a network graph of the original network (ON) is transformed into a network graph of a transformed network (TN). In the example used to describe this embodiment, we will once again assume that the ON graph is as shown in FIG. 4. Thus, the first step is to transform the ON graph shown in FIG. 4 to a TN graph. The steps to transform an ON graph into a TN graph in this embodiment are described in conjunction with the flowchart of FIG. 10, and are similar to the steps described above in conjunction with FIG. 7. The TN graph for this transformation is shown in FIG. 11 and is similar to the TN graph shown in FIG. 8.

Returning now to FIG. 10, steps 1002 through 1006 are the same as steps 702 through 706 described above. Step 1008 is similar to step 708, with the only difference being the cost assigned to the link added by this step. In this embodiment, there are two cost parameters as opposed to one cost parameter. The two cost parameters in this embodiment of the invention are referred to herein as $d_{i1}$ and $d_{i2}$, such that for any link $I_i$, $d_{i1}$ represents the IP hop cost of the link $I_i$ and $d_{i2}$ represents the cost of changing a subnet for link $I_i$. Thus, the cost of a link $I_i$ is referred to as $(d_{i1}, d_{i2})$. Continuing the notation, the IP hop cost of a given path P is given as $d_1(P)$ and the subnet change cost of a given path P is given as $d_2(P)$. The use of these cost parameters in this embodiment will be further described below in conjunction with the steps of FIG. 9. Since the links added to the TN in step 1008 already exist in the existing network, we know that there is a one IP hop cost and no cost for a subnet change. As such, the cost associated with the links added by step 1008 are assigned a cost of (1,0).

Step 1010 is similar to step 710, with the only difference being the cost assigned to the links added by this step. More particularly, the links added by step 1010 are assigned a cost of (ε,0), where ε is a small positive value.

In step 1012, the remaining links between IP routers and OXC's (i.e., those not replaced in step 1008) in the ON are replaced as follows. All such remaining links in the ON are replaced by S links from the IP router node (added in step 1004) to each of the OXC nodes (added in step 1006). Thus, if there are one or more links between an IP router and an OXC, those one or more links are collectively replaced with S links. These added links which have matching subnets are assigned costs of (½, 0) and the added links which have unmatched subnets are assigned costs of (½, 1). A link is considered to have a matching subnet if there existed an unused interface on the associated IP router (in the ON) with the same subnet as that of the node (in the TN) to which the link is connected. The first parameter of the cost represents the IP hop cost of the link while the second parameter represents the cost of changing a subnet. As such, the added links which have matching subnets have a subnet change cost of 0 while the added links which have unmatched subnets have a subnet change cost of 1.

Referring to FIG. 11, links 1102, 1104, 1106 are added with respect to IP router node 1108. Since the existing free link on IP router R1 404 is assigned subnet B, link 1104 of the TN connecting IP router node 1108 to node 110 which has a matching assigned subnet B is assigned a cost of (½, 0). Alternatively, links 1102 and 1106 are assigned costs of (½, 1) because they connect to nodes 1112 and 1114 respectively, which have assigned subnets which do not match the unused subnet of IP router 402. Similarly, links 1116, 1018, 1120 are added with respect to IP router node 1122. Since the existing free links on IP router R2 412 are assigned subnets B and D, links 1116 and 1118 of the TN connecting IP router node 1122 to nodes 1140, 1142 respectively, which have subnets matching the unused subnets, are assigned a cost of (½, 0). Alternatively, link 1120 is assigned a cost of (½, 1) because it connects to node 1144 which has an assigned subnet which does not match the unused subnets of IP router 412. Similarly, links 1126, 1128, 1130 are added with respect to IP router node 1124. Since the existing free link on IP router R3 408 is assigned subnet G, link 1126 of the TN connecting IP router node 1124 to node 1150, which has a subnet matching the unused subnet, is assigned a cost of (½, 0). Alternatively, links 1128 and 1130 are assigned a cost of (½, 1) because they connect to nodes 1148 and 1146 respectively, which have assigned subnets which do not match the unused subnet of IP router 412. Similarly, links 1134, 1136, 1138 are added with respect to IP router node 1132. Since the existing free link on IP router R4 414 is assigned subnet D, link 1136 of the TN connecting IP router node 1132 to node 1154, which has a subnet matching the unused subnet, is assigned a cost of (½, 0). Alternatively, links 1134 and 1138 are assigned a cost of (½, 1) because they connect to nodes 1156 and 1152 respectively, which have assigned subnets which do not match the unused subnet of IP router 414.

At this point, the transformation of the ON to the TN (step 902) is complete and the method continues with step 904. Prior to describing the remaining steps in detail, an overview of the methodology will be described. The algorithm described in conjunction with FIG. 9 attempts to find a solution (i.e., path) midway between two points at two extremes. The first point is the solution to the shortest path solution whereby subnet constraints are ignored, and the second point is the solution to the shortest path solution whereby subnet constraints are fully satisfied (as per the algorithm described in conjunction with FIG. 7). The algorithm then attempts to narrow down the range of available options using a Lagrangian relaxation technique as described in, J. M. Jaffe, *Algorithms for Finding Paths with Multiple Constraints*, Networks, vol. 14, 1984; and S. Chen, K. Nahrstedt, *On Finding Multi-Constrained Paths*, in Proceedings of IEEE International Conference on Communications (ICC 98), June 1998, Atlanta, both of which are incorporated herein by reference. Since in the present embodiment there are two metrics being optimized (path length and number of subnet violations), the relaxation requires mapping the two variables into one.

Returning now to FIG. 9, the method continues with step 904 in which the shortest path between the source router and destination router is determined while ignoring the subnet constraint. The path found is set to P. In step 906 it is determined whether such a path P exists. If not, then it is recognized in step 924 that no solution exists and the method ends in step 928. If a path P exists, then in step 908 the shortest path (called Q) in the TN is found where the cost of each link $I_i$ in TN is given as $(d_{i1}+\infty \times d_{i2})$. Recalling from the discussion above that $d_{i1}$ represents the IP hop cost and $d_{i2}$ represents the subnet change cost, it is seen that if a subnet change is required for the link (i.e., $d_{i2}=1$), then the cost of the link will be infinitely high. As such, the shortest path calculation of step 904 will not include in any computed shortest path a link which would require a subnet change. In other words, the shortest path calculation of step 908 will find the shortest path between the source router and the destination router which path satisfies the subnet constraint with the assumption that no changes may be made to the assigned subnets. In step 910 it is determined whether the shortest path from step 908 exists. If it exists, then control passes to step 912.

If Q does not exist from step 908, then in step 926 another shortest path calculation is performed as described above in conjunction with step 908 except that in step 926 the cost of each link in TN is given as $(d_1+\rho \times d_2)$, where $\rho$ is very large (e.g., larger than the sum of the costs of all links in the network). In cost formulation, the cost of a subnet change is very large, but not infinite, so that the shortest path calculation will attempt to find a path with the fewest number of required subnet changes. In step 930 it is determined whether $d_2(Q)<K$, i.e., is the total number of subnet changes required for path Q less than K which represents some predetermined maximum number of acceptable subnet changes. If the total number of required subnet changes for path Q is greater than or equal to the maximum (K), then it is recognized in step 932 that no solution exists and the method stops in step 928. If the total number of required subnet changes for path Q is less than the maximum (K) (step 930) then control passes to step 912.

In step 912 the following calculation is performed.

$$\gamma = \frac{d_2(P)-d_2(Q)}{d_1(Q)-d_1(P)}.$$

In step 914 the shortest path (called R) in the TN is found where the cost of each link $I_i$ in TN is given as $(d_{i1}+\gamma \times d_{i2})$. In step 916 it is determined whether $d_2(R)<K$, i.e., is the total number of subnet changes required for path R less than K which represents some predetermined maximum number of acceptable subnet changes. If the total number of required subnet changes for path R is greater than or equal to the maximum (K), then P is set to R in step 920 and control passes to step 938. If the total number of required subnet changes for path R is less than the maximum (K) then Q is set to R in step 918 and control passes to step 934 where it is determined whether Q is feasible. This test of feasibility is the same as described above in conjunction with step 608 of FIG. 6. If it is determined in step 934 that Q is feasible, then in step 936 Q is recorded as the current best solution and control passes to step 938. If it is determined in step 934 that Q is not feasible, then control passes to step 938.

In step 938 it is determined whether the method should terminate. The termination condition is a design choice and the decision to terminate may be made on the basis of various parameters. In general, the decision to terminate should be made when the potential for further improvements in the shortest path are minimal. For example, the termination condition could be $d_2(Q)=K$ since no valid solution can be found by further search. Another possible termination condition is if $(d_i(P)-d_i(Q))$ becomes less than some acceptable threshold. If the decision is made not to terminate, the method returns control to step 912. If the decision is made to terminate, the current best solution is the final solution and the method ends in step 942.

As described above, the present invention may be implemented using an appropriately configured and programmed computer. Further, the invention may be implemented within one or more network nodes in order to determine and provision network paths upon receipt of a request for network bandwidth between a source node and a destination node. Given the above description, the present invention could be implemented in a data network by one of ordinary skill in the art of data networking.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the above description assumes that all IP router interfaces have assigned subnets. However, it is possible that in some implementations some interfaces will not have assigned subnets (referred to herein as "non-designated" interfaces). The method described above may be adapted to such an implementation by considering all non-designated interfaces as belonging to the "non-designated" subnet. Thus, as applied in such an embodiment, the subnet constraint indicates that each interface assigned to the "non-designated" subnet may be connected to each other but not to otherwise assigned interfaces. As such, the principles of the present invention may be applied in networks which have a mix of assigned and unassigned interfaces. Further, it is to be understood that while the embodiments described herein show the present invention implemented in connection with an optical mesh core transport network and optical cross connects, the present invention may be implemented in networks which have other types of core transport networks and utilize other types of transport nodes.

We claim:

1. A method for determining a data path in a network which transmits data packets between IP routers via an IP protocol over a reconfigurable core network, each of said IP routers having at least one network interface for connecting to said core network, at least some of said network interfaces having an associated IP-subnet, said method comprising the steps of:

receiving a request to provision a data path from a first IP router to a second IP router; and determining a data path from said first IP router to said second IP router taking into account the IP-subnets of network interfaces of IP routers included in said path;

wherein said step of determining a data path comprises determining the data path utilizing a shortest path algorithm in which a link cost assigned to a given link of a candidate path includes a parameter indicative of a cost of changing an IP-subnet assignment of the given link.

2. The method of claim 1 wherein said step of determining a data path further comprises the step of enforcing a connectivity constraint that the network interfaces connecting each of two IP routers via the core network have the same IP-subnet.

3. The method of claim 1 wherein said path includes at least one intermediate IP router.

4. The method of claim 1 wherein said step of determining a data path further comprises the step of enforcing a connectivity constraint that the network interfaces connecting each of two IP routers via the core network have the same IP-subnet but allowing a number of violations of said connectivity constraint.

5. The method of claim 1 wherein said step of determining a data path further comprises the steps of:
computing a transform network graph to represent said network, said transform network graph comprising nodes, links and costs associated with said links;
computing a shortest path in the transform network; and
determining whether said computed shortest path is feasible.

6. The method of claim 5 wherein said transform network is computed such that all links in said transform network satisfy a connectivity constraint that the network interfaces connecting each of two IP routers via the core network have the same IP-subnet.

7. The method of claim 5 wherein said transform network is computed such that at least some links in said transform network violate a connectivity constraint that the network interfaces connecting each of two IP routers via the core network have the same IP-subnet.

8. The method of claim 7 wherein said step of computing a shortest path in the transform network further comprises the steps of:
computing a shortest path while allowing only a number of violations of said connectivity constraint.

9. The method of claim 8 wherein said step of computing a shortest path further comprises the steps of:
determining a first shortest path wherein the connectivity constraint is ignored;
determining a second shortest path wherein the connectivity constraint is fully satisfied; and
computing a third shortest path using a Lagrangian relaxation technique.

10. A method for determining a data path from a source IP router to a destination IP router in a network which transmits data packets between IP routers via an IP protocol over a reconfigurable core network, each of said IP routers having at least one network interface for connecting to said core network, at least some of said network interfaces having an associated IP-subnet, said method comprising the steps of:
computing a transform network graph to represent said network, said transform network graph comprising nodes, links and costs associated with said links; and
computing a shortest path from said source IP router to said destination IP router using said transform network graph and taking into account a connectivity constraint that the network interfaces connecting each of two IP routers via the core network have the same IP-subnet;
wherein said step of computing a shortest path comprises computing the shortest path utilizing a shortest path algorithm in which a link cost assigned to a given link of a candidate path includes a parameter indicative of a cost of changing an IP-subnet assignment of the given link.

11. The method of claim 10 further comprising the step of: determining whether a computed shortest path is feasible.

12. The method of claim 10 wherein said step of computing a shortest path allows no violations of the connectivity constraint.

13. The method of claim 10 wherein said step of computing a shortest path allows a number of violations of the connectivity constraint.

14. The method of claim 13 wherein said step of computing a shortest path further comprises the steps of:
determining a first shortest path wherein the connectivity constraint is ignored;
determining a second shortest path wherein the connectivity constraint is fully satisfied; and
computing a third shortest path using a Lagrangian relaxation technique.

* * * * *